UNITED STATES PATENT OFFICE.

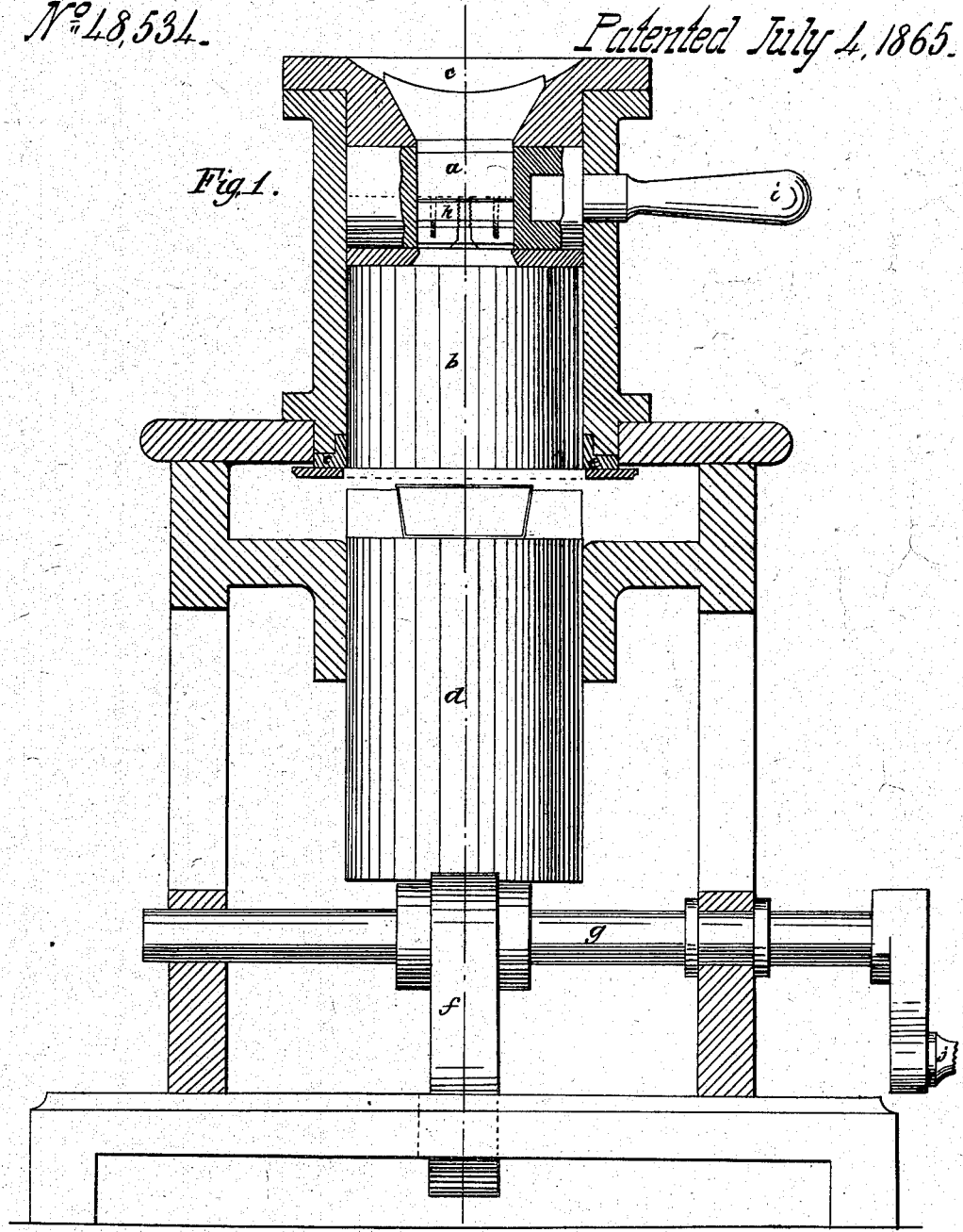

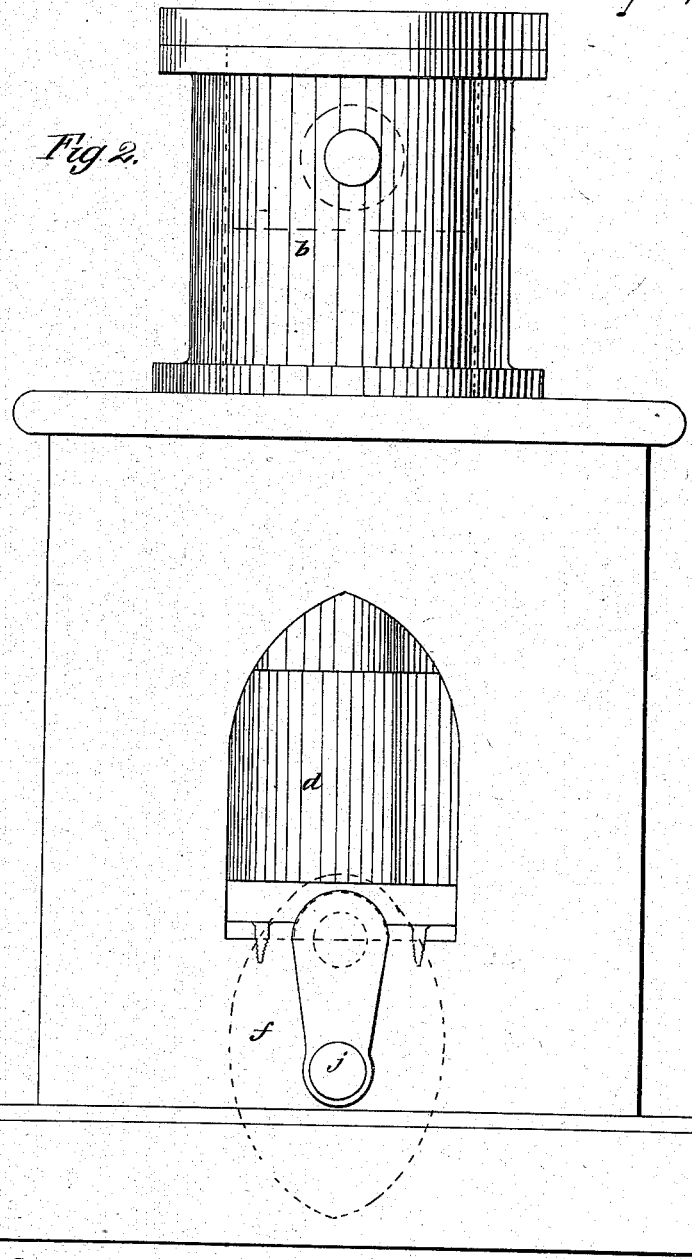

JOHN DAUGLISH, M. D., OF READING, ENGLAND, ASSIGNOR TO STEUBEN T. BACON, OF BOSTON, MASSACHUSETTS.

IMPROVEMENT IN MACHINERY FOR THE MANUFACTURE OF AERATED BREAD.

Specification forming part of Letters Patent No. 48,534, dated July 4, 1865.

*To all whom it may concern:*

Be it known that I, JOHN DAUGLISH, M. D., of Reading, in the county of Berks, in England, have made an Invention in the Manufacture of Aerated Bread; and I do hereby declare that the following, taken in connection with the drawings which accompany and form part of this specification, is a description of my invention sufficient to enable those skilled in the art to practice it.

Heretofore in making bread the dough has been formed in a closed mixing-vessel, into which carbonic acid or other suitable gas under a heavy pressure is introduced, and it has been customary, after the mixing has been completed, to discharge from the mixer, by means of the pressure therein, the dough through regulated apertures into open troughs or baking-pans. During this operation a portion of the gas contained in the dough is liberated therefrom so soon as not to cause the bread to have that vesicular structure which is needed to insure the best quality of bread, and which best quality might have been attained had not the gas escaped so largely from the dough during its passage from the mixer to the baking-pans. By my invention I prevent much of this escape of gas from the dough in its said passage and much or sudden expansion of the dough from expansion of the gas incorporated therein until the dough is fairly deposited in the baking-pans, and in consequence improve the quality of the bread produced and secure a more uniform result.

My invention consists in lessening the escape of gas from dough and the expansion thereof by surrounding the dough during its passage from the mixer to the baking-pan with any suitable aeriform body under a pressure exceeding the ordinary atmospheric pressure.

While in this specification and in the drawings belonging thereunto I show the best means known to me for putting my invention into practice, I wish to be understood that, while said means are invented by me, I make herein no claim to them, but confine my claim to the mode of operation or process, as will be seen in the sequel.

Figure 1 shows a vertical section taken in the line $x\ x$ of Fig. 2, and in elevation beyond an apparatus which I use in the practice of my invention; and Fig. 2 is an end elevation of said apparatus.

In the drawings, $c$ represents the lower part of the mixer, which is charged with dough or paste and carbonic-acid gas under heavy pressure.

$b$ is a hollow cylinder secured to $c$, and having within it an apparatus for measuring and discharging definite quantities of dough from the mixer.

$d$ is a plunger accurately fitted to slide to and fro in the cylinder and to compress the air within it, a cup-leather packing-ring, $e$, being used, as is common in similar cases, to prevent leakage of the air while compressed in the cylinder. The movement of the plunger is steadied by a suitable guide as it is forced upward by rotation of cam $f$ on the shaft $g$ and downward by gravitation and expansion of the air above in the cylinder, as the cam in its rotation permits the descent of the plunger, which in the drawings is shown in its most depressed position. The top of the plunger, when at its lowest position, is on a level with the plain surface of a table in which the plunger-guide is made, while on the top of the plunger are fitted guides to govern the position of the dough-receptacle or baking-pan.

The measuring apparatus may be described as follows: In the upper part of the cylinder $b$ a kind of rotating valve or plug, $a$, is so fitted as to tightly close the aperture in the mixer through which the dough is discharged. A mortise is made through this plug, and is fitted with a piston, $h$, which can slide within the mortise, so as to leave a receptacle communicating with the mixer, as shown in Fig. 1. This receptacle will be filled with dough as the valve rotates, carrying in it a definite amount, and when the valve $a$ has turned about one hundred and eighty degrees the piston which slides in the mortise will be brought uppermost and subjected to the pressure from the dough in the mixer, which will force down the piston, discharging the dough previously separated by this apparatus from the mass in the mixer, and thus in continued rotation of the valve $a$ definite quantities of dough may be removed and discharged till the entire mass in the mixer has been expended.

To graduate nicely the quantity of dough which shall be removed in each semi-rotation of the valve $a$, the piston is made in two parts, so arranged that by a screw the parts may be separated or drawn together, and thus the size of the dough-receptacles in the valve may be diminished or increased, as may be desirable.

The operation of the parts in combination is as follows: The shaft $g$ and the shaft $i$, by which the valve $a$ is rotated, are made to revolve in unison by any suitable connections, care being taken that the plunger shall, with a baking-pan upon it, commence to rise and shall complete its rise while the solid part of the valve $a$ closes the opening into the mixer. The effect of this is, that the air in the cylinder becomes compressed, so that when the dough is dropped or forced from the receptacle in the valve it does so in a dense atmosphere, which prevents much expansion of the gas in the dough or its escape therefrom. The plunger, with the baking-pan thereon charged with dough, descends to the level of the table, an empty pan is substituted for the charged one, and the piston again ascends to its highest position before the valve has so far turned as to discharge another measured portion of dough. The density of the air when fully compressed in the cylinder will be determined by the proportions which the diameter and stroke of the plunger bear to the space left above the plunger when fully up, and where a fixed standard of working-pressure within the mixer is assumed these proportions may be determined at the outset, so as to secure the desired pressure without the need of a discharge or safety valve.

Where it is desirable to construct an apparatus for working with various pressures in the mixer, this may be accomplished by having the proportions of parts and movements such as to secure the maximum pressure required, as this can be lessened by employment of a safety-valve adjustable to various pressures; or the mechanism may be such as will give any desired amount of movement to the plunger.

Special care and attention have to be paid to the co-ordination of the pressures or densities within and without the mixer at the time when the dough is delivered to the baking-pan. The pressure without must never exceed or quite equal the pressure within; but the less difference between the pressures which will insure proper delivery of the dough by working the piston in the mortise, the better will be the result.

It is desirable completely to prevent the expansion or vesiculation of the dough or paste in the mixer, also in the measuring apparatus, and also in the discharging chamber or cylinder, until after the measured quantity of dough has been received into the baking-pan or other receptacle. With this object additional pressure is employed in the mixer at the time of the discharge. The dough in each case is prepared and mixed under a pressure sufficient to secure not only the absorption by the water used of a sufficient quantity of carbonic acid gas to obtain the desired vesiculation of the dough whenever it is allowed to escape from the water, but also to prevent such escape and a consequent vesiculation taking place during the operation of mixing or while the dough is retained within the mixer; and for the retention of the gas within the dough the mixing-pressure is increased during the delivery of the dough through the delivering and measuring apparatus by the additional pressure in the mixer. The operator will regulate this additional pressure in the mixer at the time of delivering the dough therefrom according to the lightness or slackness of the dough and the ease and smoothness with which the measuring apparatus is made to work; and a little practice will enable him to judge in each case as to the difference of pressure it is desirable to maintain within the interior of the mixer and the cylinder or receiving-chamber. The requisite excess of pressure in the mixer is kept up by a continuous supply by pumping or any other convenient method.

It is apparent that more than one of the above-described apparatus can be attached to the mixer, or that more than one receptacle of dough at a time can be filled with dough or retained in the cylinder $b$, if it should be desired.

I claim—

The process or method of operation substantially as described.

JOHN DAUGLISH, M. D.

Witnesses:
  GEORGE F. WARREN,
  JOHN DEAN,
*Both of 17 Gracechurch Street, London, E. C.*